US012608558B2

(12) United States Patent
Perez-Rosas et al.

(10) Patent No.: US 12,608,558 B2
(45) Date of Patent: Apr. 21, 2026

(54) UNSUPERVISED FOCUS-DRIVEN GRAPH-BASED CONTENT EXTRACTION

(71) Applicant: REGENTS OF THE UNIVERSITY OF MICHIGAN, Ann Arbor, MI (US)

(72) Inventors: Veronica Perez-Rosas, Ann Arbor, MI (US); Ashkan Kazemi, Ann Arbor, MI (US); Rada Mihalcea, Ann Arbor, MI (US)

(73) Assignee: REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 514 days.

(21) Appl. No.: 17/964,400

(22) Filed: Oct. 12, 2022

(65) Prior Publication Data

US 2023/0114425 A1 Apr. 13, 2023

Related U.S. Application Data

(60) Provisional application No. 63/254,872, filed on Oct. 12, 2021.

(51) Int. Cl.
 *G06F 40/40* (2020.01)
 *G06F 40/205* (2020.01)
 (Continued)

(52) U.S. Cl.
 CPC ............ *G06F 40/40* (2020.01); *G06F 40/205* (2020.01); *G06F 40/247* (2020.01); *G06F 40/30* (2020.01)

(58) Field of Classification Search
 CPC ............... G06F 16/313; G06F 16/3329; G06F 16/3344; G06F 40/205; G06F 40/211;
 (Continued)

(56) References Cited

U.S. PATENT DOCUMENTS 6,529,892 B1 * 3/2003 Lambert ............... G06F 40/268
 707/999.005
7,809,548 B2 * 10/2010 Mihalcea ............ G06F 16/3344
 704/9

(Continued)

FOREIGN PATENT DOCUMENTS

CA 3119416 A1 * 5/2021 ........... G06F 16/367
CN 107688652 A 2/2018

OTHER PUBLICATIONS

Junjie Chen, Hongxu Hou, and Jing Gao. 2020. Inside Importance Factors of Graph-Based Keyword Extraction on Chinese Short Text. ACM Trans. Asian Low-Resour. Lang. Inf. Process. 19, 5, Article 63 (Sep. 2020) (Year: 2020).*

(Continued)

*Primary Examiner* — Thuykhanh Le
(74) *Attorney, Agent, or Firm* — MARSHALL, GERSTEIN & BORUN LLP

(57) ABSTRACT

Systems and methods for processing natural language text using a graph obtain a natural language text and a query text, and parse that the natural language text into the plurality of text units, associating each with a graph node, and removing information leak text units from the plurality of text units. Connecting relationship between at least two of the remaining set of the plurality of text units are determined and associated with a graph edge between graph nodes. Based on the probabilistic relations between each graph node and the query text, graph node restart probabilities are determined for one or more of the graph nodes. The graph nodes that can be ranked.

25 Claims, 4 Drawing Sheets

(51) Int. Cl.
    *G06F 40/247*     (2020.01)
    *G06F 40/30*     (2020.01)
(58) Field of Classification Search
    CPC .... G06F 40/237; G06F 40/247; G06F 40/284;
              G06F 40/30; G06F 40/40; G06N 20/00
    See application file for complete search history.

(56) References Cited

U.S. PATENT DOCUMENTS

| | | | | |
|---|---|---|---|---|
| 9,348,815 B1* | 5/2016 | Estes | | G06F 40/40 |
| 9,535,902 B1* | 1/2017 | Michalak | | G06F 16/3331 |
| 9,710,544 B1* | 7/2017 | Smith | | G06F 16/36 |
| 9,886,501 B2* | 2/2018 | Krishnamurthy | | G06F 16/345 |
| 10,831,806 B2* | 11/2020 | Feigenblat | | G06F 16/93 |
| 10,936,796 B2* | 3/2021 | Kadambi | | G06F 40/30 |
| 11,138,249 B1* | 10/2021 | Tosik | | G06F 16/3347 |
| 11,443,114 B1* | 9/2022 | He | | G06N 5/02 |
| 11,960,820 B2* | 4/2024 | Druck | | G06F 40/134 |
| 2005/0278325 A1* | 12/2005 | Mihalcea | | G06F 40/284 |
| 2009/0175545 A1* | 7/2009 | Cancedda | | G06F 40/268 |
| | | | | 382/229 |
| 2011/0225173 A1* | 9/2011 | Gulhane | | G06V 20/635 |
| | | | | 707/E17.069 |
| 2012/0215791 A1* | 8/2012 | Malik | | G06F 40/30 |
| | | | | 707/E17.084 |
| 2012/0254333 A1* | 10/2012 | Chandramouli | | G06F 40/10 |
| | | | | 709/206 |
| 2013/0138428 A1* | 5/2013 | Chandramouli | | H04L 63/1416 |
| | | | | 704/9 |
| 2014/0279757 A1* | 9/2014 | Shimanovsky | | H04W 4/029 |
| | | | | 706/12 |
| 2016/0275177 A1* | 9/2016 | Yin | | G06F 16/951 |
| 2016/0321357 A1* | 11/2016 | Novacek | | G06F 16/35 |
| 2017/0337262 A1* | 11/2017 | Smith | | G06F 16/36 |
| 2017/0337268 A1* | 11/2017 | Ait-Mokhtar | | G06F 16/3344 |
| 2018/0225372 A1* | 8/2018 | Lecue | | G06F 16/36 |
| 2018/0375806 A1* | 12/2018 | Manning | | H04L 67/53 |
| 2019/0073355 A1* | 3/2019 | Zhang | | G06F 16/36 |
| 2019/0108285 A1* | 4/2019 | Stillwell, Jr. | | G06F 16/951 |
| 2019/0171792 A1* | 6/2019 | Manica | | G06F 40/284 |
| 2019/0171944 A1* | 6/2019 | Lu | | G06N 5/025 |
| 2019/0236140 A1* | 8/2019 | Canim | | G06F 40/30 |
| 2019/0236469 A1* | 8/2019 | Canim | | G06N 5/045 |
| 2019/0278777 A1* | 9/2019 | Malik | | G06F 16/9024 |
| 2019/0325066 A1* | 10/2019 | Krishna | | G06N 3/0455 |
| 2019/0361900 A1* | 11/2019 | Rogynskyy | | H04M 15/755 |
| 2020/0210466 A1* | 7/2020 | Yin | | G06F 16/313 |
| 2020/0327198 A1* | 10/2020 | Ding | | G06F 40/30 |
| 2020/0342055 A1* | 10/2020 | Patra | | G06N 3/048 |
| 2021/0012217 A1* | 1/2021 | Croutwater | | G06F 16/3329 |
| 2021/0012218 A1* | 1/2021 | Croutwater | | G06F 16/30 |
| 2021/0103702 A1* | 4/2021 | Belezko | | G06F 40/30 |
| 2021/0303638 A1* | 9/2021 | Zhong | | G06F 18/231 |
| 2021/0406706 A1* | 12/2021 | Hasan | | G06N 3/08 |
| 2022/0035993 A1* | 2/2022 | Bhandarkar | | G06F 40/169 |
| 2022/0100970 A1* | 3/2022 | Kadam | | G06F 40/166 |
| 2022/0121695 A1* | 4/2022 | Zhang | | G06F 40/30 |
| 2022/0229986 A1* | 7/2022 | Narendula | | G06F 40/253 |
| 2022/0229987 A1* | 7/2022 | Davasam Suryanarayan | | |
| | | | | G06N 3/0895 |
| 2022/0229990 A1* | 7/2022 | Turkkan | | G06F 40/289 |
| 2022/0229998 A1* | 7/2022 | Naboka | | G06F 40/284 |
| 2022/0237383 A1* | 7/2022 | Park | | G06F 40/30 |
| 2022/0245352 A1* | 8/2022 | Nivarthi | | G06F 40/295 |
| 2022/0245353 A1* | 8/2022 | Turkkan | | G06F 40/284 |
| 2022/0245361 A1* | 8/2022 | Narendula | | G06F 16/3344 |
| 2023/0022673 A1* | 1/2023 | Derzsy | | G06N 5/022 |
| 2023/0054726 A1* | 2/2023 | Roy | | G06F 16/35 |
| 2023/0103834 A1* | 4/2023 | Jeong | | G06F 40/30 |
| | | | | 704/9 |
| 2023/0140938 A1* | 5/2023 | Sun | | G06F 40/205 |
| | | | | 715/256 |
| 2023/0252233 A1* | 8/2023 | Gutierrez | | G06F 40/40 |
| | | | | 704/9 |

OTHER PUBLICATIONS

Atanasova, P., Grue Simonsen, J., Lioma, C., & Augenstein, I. (2020). Generating Fact Checking Explanations. arXiv e-prints, arXiv-2004. (Year: 2020).*

Atanasova et al., Generating fact checking explanations, In Proceedings of the 581h Annual Meeting of the Association for Computational Linguistics, 7352-7364 (2020).

Belwal et al., A new graph-based extractive text summarization using keywords or topic modeling, J. Ambient. Intell. Human Comput., 12:8975-8990 (2021).

Bird et al., "The natural language toolkit," In Proceedings of the ACL Interactive Poster and Demonstration Sessions, 214-217 (2004).

Kazemi et al., Biased TextRank: Unsupervised Graph-Based Content Extraction, Department of Computer Science & Engineering, (2020).

Lin, A package for automatic evaluation of summaries, In Text Summarization Branches Out, pp. 74-81 (2004).

Mao et al., Extractive summarization using supervised and unsupervised learning, Expert Systems With Applications, 133:173-181 (2019).

Xiong et al., Query-focused multi-document summarization using hypergraph-based ranking, Information Processing and Management, 52:670-681 (2016).

\* cited by examiner

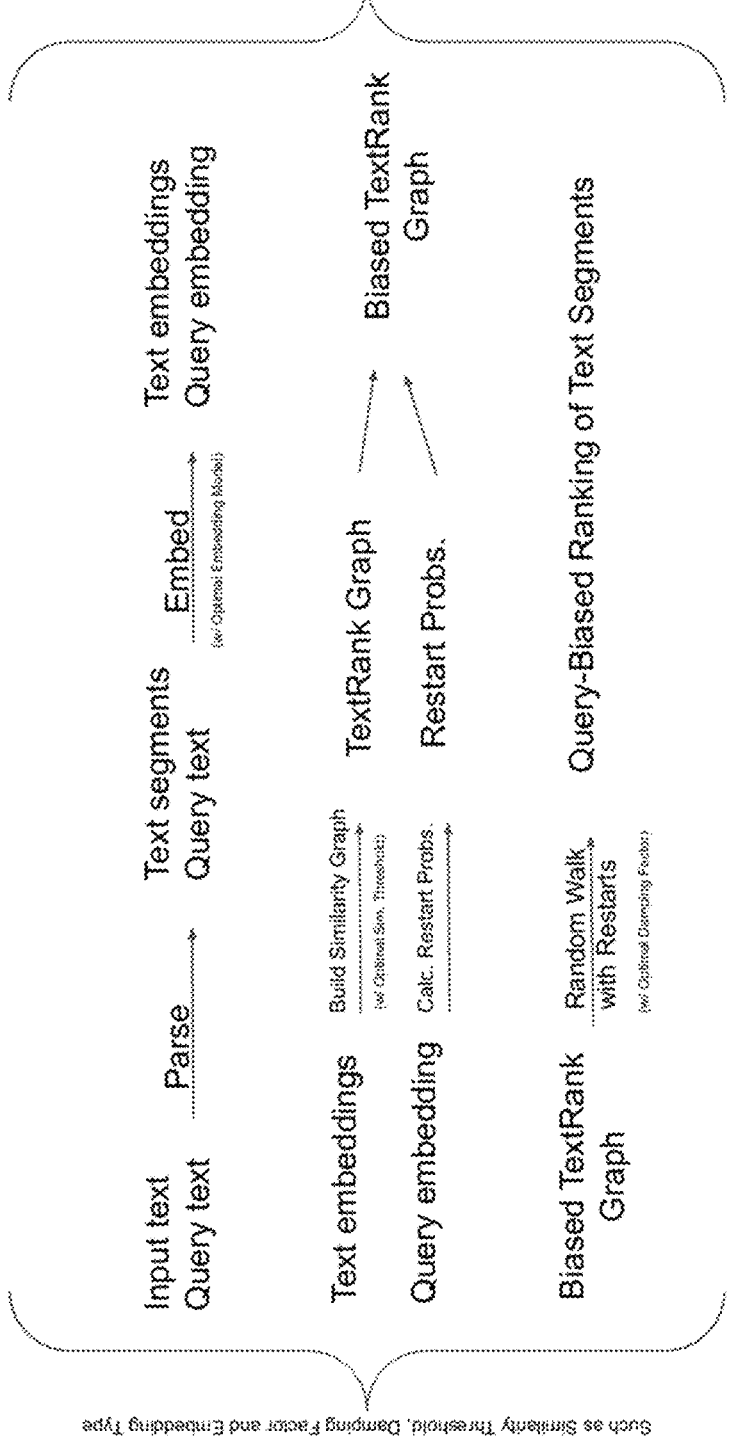
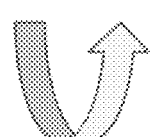
*FIG. 2*

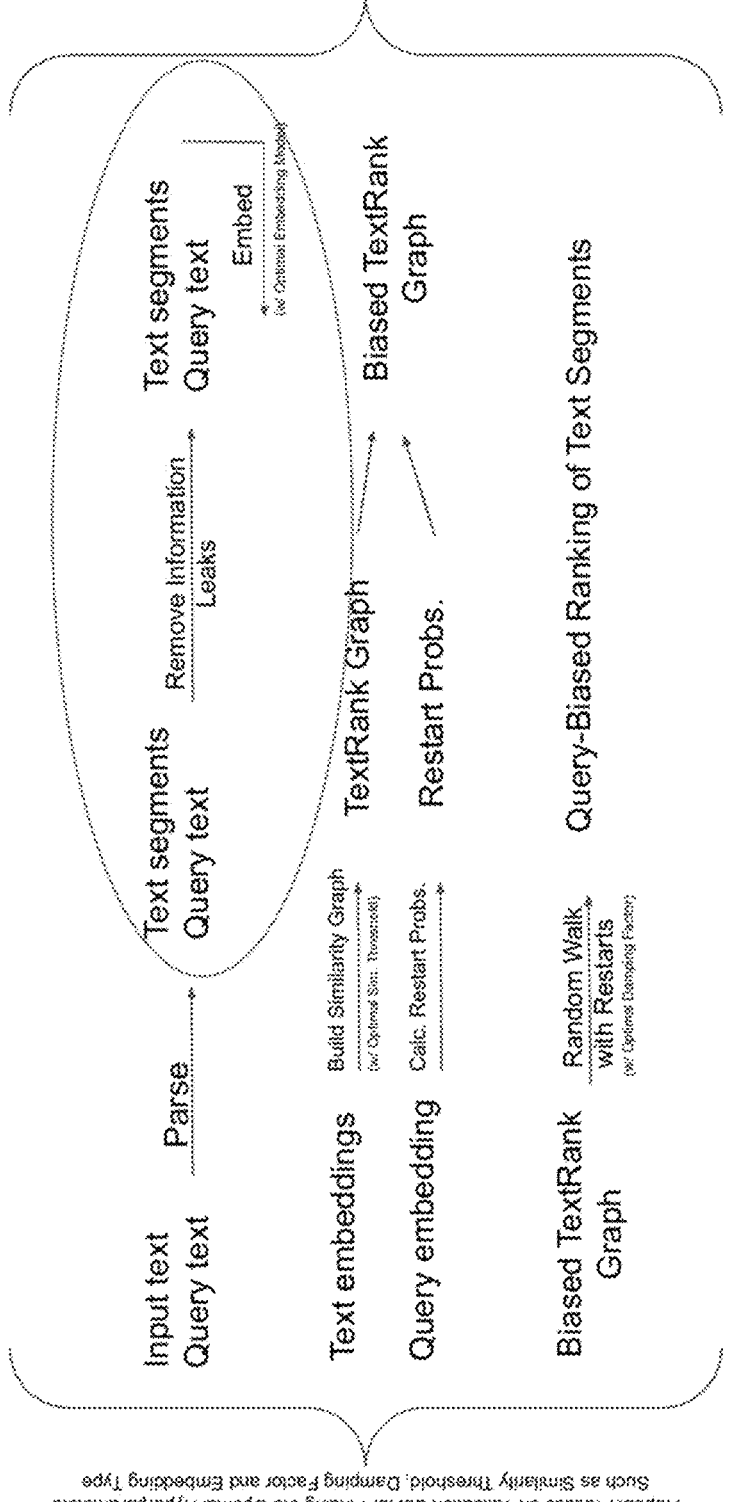

Input text
Query text

Parse

Text segments
Query text

Remove Information
Leaks

Text segments
Query text

Embed
(w/ Context Embedding Model)

Text embeddings

Build Similarity Graph
(w/ Optimal Sim. Threshold)

TextRank Graph

Query embedding

Calc. Restart Probs.

Restart Probs.

Biased TextRank
Graph

Random Walk
with Restarts
(w/ Optimal Damping Factor)

Query-Biased Ranking of Text Segments

Biased TextRank
Graph

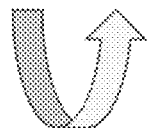

Repeat Process on Validation Set for Finding the Optimal Hyperparameters
Such as Similarity Threshold, Damping Factor and Embedding Type

*FIG. 3*

UNSUPERVISED FOCUS-DRIVEN GRAPH-BASED CONTENT EXTRACTION

CROSS-REFERENCE TO RELATED APPLICATIONS

This application claims priority to U.S. Provisional Application No. 63/254,872, filed Oct. 12, 2021, which is incorporated herein by reference in its entirety.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Content and information extraction are central to many Natural Language Processing (NLP) tasks, from question answering to text summarization and beyond. While the state-of-the-art solutions for these tasks mainly rely on training neural network architectures on very large datasets, there have been questions around the sustainability of these solutions and their effects on the environment. As highlighted in published work, training one large transformer-based model produces approximately four times more $CO_2$ emissions than a car in its lifetime. These considerable negative environmental outcomes call for lighter and less resource-intensive alternative methods.

TextRank is a light-weight unsupervised graph-based content extraction algorithm that was initially designed for summarization and keyword extraction applications. Since its introduction, the TextRank processes have been adapted and used in numerous other applications and settings, including opinion mining, credibility assessment, and lyrics summarization, among others. Most recently, TextRank has been included in the latest release of the popular spaCy library. There have been online tutorials and updating studies that demonstrate TextRank's relevance years after its initial release.

Some of the TextRank extensions that have been proposed in recent years rely on the idea of personalized (or topic-sensitive) PageRank and its successor algorithms. For instance, PositionRank changed the TextRank rankings to account for the position of candidate words in the input document, and showed that this position-aware algorithm led to improvements in keyword extraction over TextRank and over several other baselines.

There is, nevertheless, a need for improvements in these conventional techniques for summarization and keyword extraction on NLP text.

SUMMARY OF THE INVENTION

The present techniques include methods and systems for biased TextRank that relies upon document representation models and similarity measures to enable capturing meaning closeness between graph nodes and a target (focus) text thereby resulting in improved summarizations of NLP text, keyword extractions of NLP text, explanation extraction of NLP text, and other applications. Indeed, the present techniques describe methods and systems that can be generalizable to any number of other applications that require content extraction and/or content ranking.

In accordance with an implementation, a method of processing natural language text using a graph, the method comprises: obtaining, at one or more processors, natural language input text comprising a plurality of text units and obtaining a query text; parsing, at the one or more processors, the natural language input text into the plurality of text units, associating each of the plurality of text units with a graph node, and removing information leak text units from the plurality of text units to generate a remaining set of the plurality of text units; determining, at the one or more processors, at least one connecting relationship between at least two of the remaining set of the plurality of text units and associating the at least one connecting relationship with at least one graph edge connecting at least two of the plurality of graph nodes; associating, at the one or more processors, a probabilistic relation between each graph node and the query text; constructing, at the one or more processors, a graph using the plurality of graph nodes that correspond to one of the remaining set of the plurality of text units and the at least one graph edge; based on the probabilistic relations between each graph node and the query text, determining graph node restart probabilities for one or more of the graph nodes associated with each of the remaining plurality of text units and generating a query text-based biased graph of the remaining set of the plurality of text units and containing graph nodes; and ranking the graph nodes of the query text-based biased graph by applying a graph-based ranking algorithm biased towards assigned random restart probabilities at the graph nodes using the probabilistic relation associated with each graph node and the query text.

In an example, the method further comprises: identifying information leaks using a comparison between ground truth data and the natural language input text.

In another example, identifying information leaks using the comparison comprises: determining if there are exact mentions of a ground truth label final answer present in the natural language input text document and removing the final answers from the natural language input text.

In another example, the method further comprises applying a similarity threshold to each graph node to determine whether two graph nodes are connected to at least one graph edge; and in response to a similar threshold being met, allowing connections among the two graph nodes with a certain level of similarity and otherwise preventing a connection between the two graph nodes.

In another example, the method further comprises applying a cosine similarity function to each graph node to determine a similarity between the graph node and the query text.

In another example, the method further comprises applying a damping factor to adjust the ranking of the graph nodes of the query text-based biased graph toward the query text, where decreasing the damping factor increases random restart probabilities at the graph nodes and increasing the damping factor decreases the random restart probabilities at the graph nodes.

In another example, the method further comprises performing random restarts at graph nodes by assigning highest restart probabilities to graphs nodes that are most similar to the query text.

In another example, the method further comprises performing random restarts by assigning a real number between 0 to 1 to each graph node based on determined similarity to the query text.

In another example, the method further comprises performing random restarts by applying the expression:

$$BiasedTextRank(V_i) =$$

$$BiasWeight_i * (1 - d) + d * \sum_{V_j \in In(V_i)} \frac{w_{ji}}{\sum_{V_k \in Out(V_j)} w_{jk}} BiasedTextRank(V_j)$$

where $BiasWeight_i$ is set to a value indicating a similarity of a graph node $V_i$ to the query text, and d is a damping factor.

In another example, the method further comprises selecting at least one keyword from the plurality of text units based upon the rankings of graph nodes.

In another example, the plurality of text units comprises a plurality of sentences, the method further comprising selecting at least one of the plurality of sentences based upon the rankings.

In another example, the method further comprises forming a summary of the natural language input text, the summary comprising the at least one selected sentence.

In another example, the method further comprises forming at least one summary of the natural language input text by combining sentences having the highest rankings determined using the rankings associated with the plurality of sentences in the plurality of texts and the query text.

In another example, the method further comprises selecting at least one word sense associated with at least one of the plurality of text units based upon the rankings of the graph nodes.

In another example, selecting the plurality of text units from the natural language input text comprises selecting a plurality of open-class words from said at least one natural language text.

In another example, associating at least one word sense with each text unit comprises determining at least one of a synonym word, word phrase, concept, and a definition associated with each text unit.

In another example, determining the at least one synonym word, word phrase, concept, or definition comprises determining the at least one synonym word, word phrase, concept, or definition based upon a lexical knowledge base.

In another example, determining the at least one connecting relation between at least two of the plurality of word senses comprises determining the at least one connecting relation between at least two of the plurality of word senses based upon a semantic, lexical, or syntactic relation.

In another example, determining the at least one connecting relation between at least two of the plurality of word senses based upon the semantic, lexical, or syntactic relation comprises determining the at least one connecting relation between at least two of the plurality of word senses based on hypernymy, hyponomy, meronomy, holonomy, entailment, causality, attribute, and pertainimy, or based on co-occurrence information from a raw or annotated corpus.

In another example, determining the at least one connecting relation between at least two of the plurality of word senses comprises forming a coordinate connecting relation based on a plurality of semantic relations.

In another example, determining the at least one connecting relation between at least two of the plurality of word senses comprises forming a connecting relation between co-occurring text units.

In another example, determining at least one keyword based on the plurality of text units and the plurality of rankings comprises sorting the graph nodes based upon the plurality of rankings.

In another example, determining the at least one keyword comprises selecting at least one keyword based upon the ranking of the graph nodes.

In another example, determining the at least one keyword comprises forming at least one multi-word key word from the selected keywords.

In another example, forming at least one multi-word keyword comprises combining a plurality of adjacent selected keywords.

BRIEF DESCRIPTION OF THE DRAWINGS

The figures described below depict various aspects of the system and methods disclosed herein. It should be understood that each figure depicts an example of aspects of the present systems and methods.

FIG. 1A is a plot for an explanation extraction study. FIG. 1B is a plot for a focused summarization: democrat study. FIG. 1C is a plot for a focused summarization:republican study. Each plot shows values for three different dampening factors (DF).

FIG. 2 is a schematic of an example process for biased TextRank, in accordance with an example.

FIG. 3 is a schematic of an example process for achieving biased TextRank where information leaks are removed prior to an embedding process performed on the natural language input text and an embedding process performed on the query text, in accordance with an example.

DETAILED DESCRIPTION

Figures 1A, 1B, 1C:
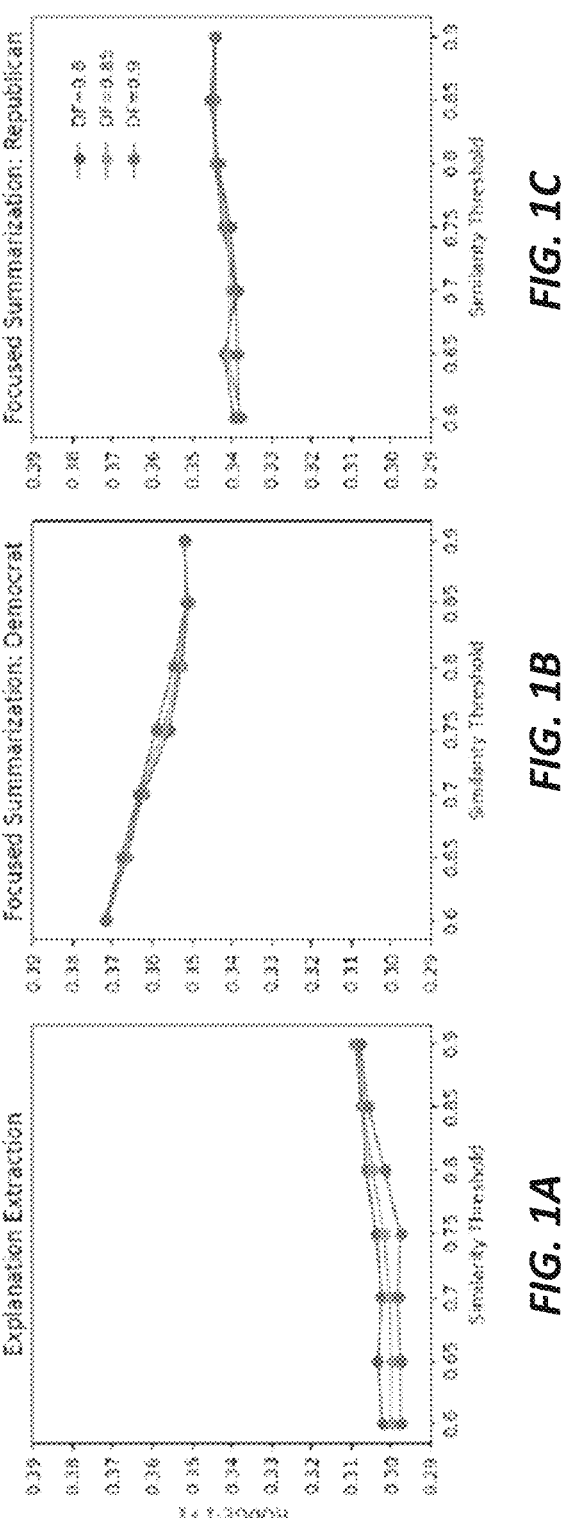
FIGS. 1A-1C are plots of similarity thresholds for three different ablation studies, respectively, in accordance with an example.

The present techniques include methods and systems for biased TextRank that relies upon document representation models and similarity measures to enable capturing meaning closeness between graph nodes and a target (focus) text thereby resulting in improved summarizations of NLP text, keyword extractions of NLP text, explanation extraction of NLP text, and other applications. Indeed, the present techniques describe methods and systems that can be generalizable to any number of other applications that require content extraction and/or content ranking.

In an implementation, the present techniques include methods and systems generally referred to herein as "biased TextRank," which is an unsupervised graph-based algorithm for focused content-extraction. The present techniques offer numerous technological advantages over conventional techniques for processing, including for example, that the present techniques do not require training data, are fast, resource-efficient, and straightforward to implement and fine-tune. In various examples, biased TextRank is language agnostic, in the sense that as long as document embedding models exist for a language, biased TextRank can be directly applied. With the recent emergence of technologies like LASER with pretrained language embeddings for 100+ languages, such representations are readily available for many languages.

We have evaluated and performed extensive analyses of biased TextRank through experiments on two tasks: focused summarization and explanation extraction. We also performed an ablation study to show the effects of the TextRank damping factor and the similarity threshold parameters, providing insight on how Biased TextRank parameters can be tuned. As a result, in an example implementation, we introduce and make available a focused summarization dataset, in particular, a novel dataset for focused summarization that contains transcripts of the U.S. presidential debates during the past 40 years, alongside articles from both Democrat and Republican media summarizing the events of the debates. While described in reference to TextRank, it is noted that the present techniques may be implemented to augment other unsupervised graph-based algorithm for focused content-extraction.

As mentioned above, the TextRank algorithm is a content extraction algorithm that represents texts as graphs for sentence and keyword extraction purposes and uses the PageRank algorithm to rank sentences or keywords. Since TextRank was first released, it has been applied to tasks such as summarization, keyword extraction, opinion mining, credibility assessment, and others.

Conventional applications of TextRank include work that explored inter and intra-document relationships in generic and topic-focused multidocument summarization. They used TextRank and a combination of inter and intra-document edge weighting mechanisms alongside a diversity penalty to solve DUC 2002-2005 multidocument summarization tasks. Another proposed conventional technique is "PositionRank" which is a keyword-extraction method based on TextRank and personalized PageRank. In this work, the creators biased the TextRank scores based on how early the keywords appear in the input document and their method is designed for keyword extraction only. Neither of these techniques, however, allowed for contextual embeddings and using intra-document similarities that allow for a topical focus, and bias identification and extraction. By contrast, among the advantages of the present techniques is that by overcoming such limitations, the present techniques can be used for a wide variety of applications beyond keyword extraction or multidocument summarization.

Although focused summarization has not been widely studied within the NLP community, query-focused or query-biased summarization is a known problem in the context of Information Retrieval. Some have proposed two extractive query-biased summarization methods (classification and ranking-based) for web page summarization. They extracted features from both the content and context of a web page and feed them to an SVM that solves both the classification and ranking problem formulations. Others have proposed a technique titled AttSum, a system that leverages joint learning of query relevance and sentence salience ranking, the two main modules of query-focused summarization and achieve competitive results on the DUC datasets. While related work has been published in NLP venues, query-focused summarization has been mainly studied by the Information Retrieval community.

Model explainability and natural language explanation extraction and generation are broad and important topics of ongoing research within the AI and NLP communities. However explanation extraction in the context of fact-checking and misinformation detection has remained relatively understudied. Some authors address the task of extracting fact-checking explanations, in which statements documenting the veracity of a fact-checked statement are used to derive a short summary explanation. For example, a techniques titled BERT has been proposed and is based sentence selection model that identifies top relevant sentences from the input as candidate explanations. In similar context, highlighting natural language explanations for fact-checking and misinformation detection applications has been studied within the research community.

Example Implementation of Biased TextRank

In contrast to these techniques, biased TextRank, while built upon the TextRank algorithm, in some examples, changes how random restart probabilities are assigned, and has been designed to give higher likelihood to the nodes that are more relevant to a certain "focus" of the task.

Node Scoring with Random Restart Probabilities

TextRank Node Scoring: TextRank operates on graphs that are built from natural language texts. For instance, in the original TextRank application, the graphs are built from sentences in a text, or from individual words. The text spans are connected through links that are extracted from text, which reflect the strength of the relation between those spans. For instance, sentences can be linked by their similarity, or words can be linked by their proximity in the text. Assuming a graph representation with nodes Vi and the edges between nodes having a weight $_{wij}$, TextRank uses the following formula to iteratively update the TextRank score of a node:

$$TextRank(V_i) = (1 - d) + d * \sum_{V_j \in In(V_i)} \frac{w_{ji}}{\sum_{V_k \in Out(V_j)} w_{jk}} TextRank(V_j)$$

where d is a damping factor typically set to 0.85.

Biased TextRank Node Scoring. In TextRank, each node has an equal random restart probability, and therefore all the nodes are treated equally during the application of the algorithm. Biased TextRank however operates on assigning these random restart probabilities to favor a specific focus. When executing the algorithm, the nodes that have a high random restart likelihood will have a higher chance of being reached during the random jump. Therefore, the ranking algorithm is changed to:

$$BiasedTextRank(V_i) =$$
$$BiasWeight_i * (1 - d) + d * \sum_{V_j \in In(V_i)} \frac{w_{ji}}{\sum_{V_k \in Out(V_j)} w_{jk}} BiasedTextRank(V_j)$$

where $BiasWeight_i$ is set to a value that reflects the relevance of the node $V_i$ for the focus of the task, and the damping factor, d, is set as before to 0.85.

Example Biased TextRank Algorithm

In an example, a biased TextRank process started with a document and produced a ranking over text spans according to the biased TextRank expression above. The input document was first parsed into chunks that are then embedded into vectors to facilitate computation. These vectors constitute the nodes of the graph, which were then used to determine a ranking for the sentences. The focus (or bias) of the task was also embedded, and used to calculate the bias weights. After ranking, the top K ranked sentences were selected and returned as a result.

Algorithm 1 below illustrates an example implementation of a biased TextRank implementation. In the illustrated example, a matrix representation was used such that all vertices were processed in one step. We discuss each step in detail in the following subsections.

examples, we use a short text describing the focus of the content extraction to determine the similarity between the

---

Algorithm 1 Pseudocode for Biased TextRank.

---

```
 1: procedure BIASEDTEXTRANK(Document, Bias, SimilarityThreshold, DampingFactor)
 2:     Sentences = PARSE(document)
 3:     SentenceEmbeddings = EMBED(Sentences)
 4:     BiasEmbedding = EMBED(Bias)
 5:     SimilarityMatrix = GRAPH CONSTRUCTION(SentenceEmbeddings,SentenceEmbeddings)
 6:     BiasWeights = RANDOM RESTART PROBABILITIES(BiasEmbedding,SentenceEmbeddings)
 7:     for each Row in SimilarityMatrix do
 8:        for each Cell in Row do
 9:           if Cell.value < SimilarityThreshold then
10:              Cell.value = 0
11:           end if
12:        end for
13:     end for
14:     SimilarityMatrix =
15:        DampingFactor * SimilarityMatrix + (1 − DampingFactor) * BiasWeights
16:     RETURN RandomWalkWithRestart(SimilarityMatrix)
17: end procedure
18:
19: procedure RANDOMWALKWITHRESTART(Matrix)
20:     n = Matrix.len
21:     Ranks = new Aray(n).INITIALIZE(1/n)
22:     for as long as Ranks has not converged do
23:        Ranks = Matriax$^T$ · Ranks
34:     end for
35:     RETURN Ranks
26: end procedure
```

---

Thus, in various examples, biased TextRank is implemented as a process that includes a parsing process, an embedding process, a graph construction, and a random restart probabilities process. An example implementation of these is now described.

PARSE. Biased TextRank extracts relevant context from input documents by ranking document pieces. In order to do this, we need to parse the documents into those pieces. For instance, if the algorithm is used for sentence extraction, we parse the input into sentences. If it is to be used for keyword extraction, we parse the input into tokens.

EMBED. Transforming documents into graphs requires mathematical representations of the nodes of the graph. This mathematical representation will enable similarity comparison between nodes, an integral part of the TextRank algorithm. With recent advances in contextual embedding technologies, we found Sentence-BERT (SBERT) to be a good model to embed English texts. For non-English sentence embedding, contextual embedding models like LASER are useful. Word embedding models like Word2Vec can similarly be used in the case of keyword extraction. After embedding document pieces DPi, i=1 . . . n into embedding vectors Ei, i=1 . . . n of fixed length, we can build a representative graph of the input document.

GRAPH CONSTRUCTION. To build a graph representation of the input, we followed the same graph building strategy as in the original TextRank algorithm. For sentence extraction, the process was as follows: Each sentence embedding SEi is represented as a node Vi in a graph GD of the input document. We add an edge Eij connecting nodes Vi and Vj, if SimilarityMeasure(SEi, SEj)>SimilarityThreshold. The weight wij of Eij equals SimilarityMeasure(SEi, SEj). We use cosine similarity as our SimilarityMeasure.

RANDOM RESTART PROBABILITIES. Biased TextRank uses assigning random restart probabilities to nodes. Similar to the topic-sensitive PageRank algorithm, this is achieved by assigning higher restart probabilities to nodes that are most similar to the focus of the task. In various nodes and the task. We transform the description into a fixed-length embedding vector using the EMBED procedure (bias embedding vector) and calculate its similarity to the nodes. The higher the similarity (obtained using cosine similarity or any other similarity measure) between a node and the bias embedding vector, the higher restart probability is assigned to that node.

Experiments

We conduct two main experiments to explore the ability of biased TextRank to perform focused content extraction.

Experimental Settings. We implemented biased TextRank using the NLTK library and SBERT in Python. For sentence embedding retrieval, we used the pretrained, base SBERT model. We ran our experiments on a machine using one Nvidia 1080 Ti GPU and the GPU was only used to make embedding retrieval faster. A run of biased TextRank for large documents on a graph with approximately 1,000 nodes took an average 1.6 seconds to complete. This measurement also included the embedding retrieval time.

Since all of our experiments focused on sentence extraction, we used the sentence tokenizer from the NLTK (Bird et al., "The natural language toolkit," In Proceedings of the ACL Interactive Poster and Demonstration Sessions, pgs. 214-217 (2004)) library. During our evaluations we used the ROUGE (Lin, "A package for automatic evaluation of summaries. In Text Summarization Branches Out, pgs. 74-81 (2004)) as the main performance metric.

Focused Summarization. Focused summarization, much like query-focused summarization (its counterpart in information retrieval), aims to generate summaries for an input text with a given focus.

To evaluate the applicability of biased TextRank for extracting focused summaries, we collected a dataset of news reportage from Democrat and Republican media's interpretations of the U.S. presidential debates from 1980 to 2016. We used the collected news reportage that summarize the events of the debates and apply biased TextRank to reproduce the biased interpretations of Democrat and Republican media. The New York Times online public archives are the source of our Democrat summary references. For Republican debate coverage, we collected reportage from Fox News, The New York Post, and Houston Chronicle. We also collected debate transcripts from debates.org, a public resource by the U.S. Commission on Presidential Debates. Since it is difficult to find news covering older debates, we could not find a number of articles that cover presidential debates of the 1970s and 1960s from either side. General statistics for the collected dataset of U.S. presidential debate news coverage are presented in Table 1.

To generate the focused summaries we used debates transcripts and a fixed bias description for each side. We picked the Republican bias text from the opening paragraphs in the Republican party Wikipedia page that describes party values. For the Democrat bias text, we chose the headlines of their most recent party platform document. After running biased TextRank on the parsed debate transcripts, we picked the top 20 ranked sentences as the focused summary. We also obtain unfocused summaries of the debates using TextRank. Our implementation of TextRank is identical to biased TextRank, with the difference that each node gets an equal random restart probability.

TABLE 1

Focused Summarization Dataset Statistics

|  | #documents | avg #tokens | std #tokens |
|---|---|---|---|
| Democrat | 26 | 2130 | 406 |
| Republican | 22 | 1087 | 281 |
| Transcripts | 33 | 18868 | 4708 |

TABLE 2

Results for Biased TextRank application in focused summarization are evaluated using the ROUGE-N F1 score. The party column determines the set of ground truths that summaries are compared against; Democrat refers to the New York Times articles covering the debates and Republican refers to a collection of ground truth text collected from Fox News, the New York Post and Houston Chronicle.

| Party | Method | ROUGE-1 | ROUGE-2 | ROUGE-L |
|---|---|---|---|---|
| Democrat | TextRank | 17.04 | 3.54 | 16.83 |
|  | BiasedTextRank | 30.09 | 5.84 | 21.35 |
| Republican | TextRank | 21.86 | 3.38 | 18.39 |
|  | BiasedTextRank | 33.66 | 5.85 | 22.11 |

Table 2 presents the results when comparing generated summaries against the corresponding Democrat and Republican ground truths. As observed, the focused summaries outperform unfocused summaries on both sides in capturing a biased overview of the debates. For the Democrat summary references, biased TextRank has a gain of 13.05, 2.3 and 4.52 for ROUGE-1, ROUGE-2 and ROUGE-L F1 scores, respectively, over TextRank. Similar differences of 11.8 (ROUGE-1), 2.47 (ROUGE-2), and 3.72 (ROUGE-L F1) scores emerge in the Republican ground truth as well. We attribute the performance gap to the attention of Biased TextRank to the underlying biases already existing in the ground truth text.

Overall, the experiments show that focused summaries produced by biased TextRank meaningfully improve over normal summaries when compared against a biased reference. We believe biased TextRank is a better fit than conventional extractive summarization methods when there is a clear focus or bias required in the desired summary.

Explanation Extraction. Introduced as "explanation generation" for fact-checking by Atanasova et al., "Generating fact checking explanations," In Proceedings of the 58th Annual Meeting of the Association for Computational Linguistics, pgs. 7352-7364 (2020), this task focuses on extracting explanations from articles elaborating on the veracity of statements in the PolitiFact-based LIAR-PLUS dataset. The dataset consists of 2,533 data points split into 1,278 validation and 1,255 test. Each data point consists of a statement, its veracity (e.g., true, false, mostly-true), a detailed article justifying the assigned veracity of the statement by fact-checkers, and a closing paragraph summarizing the explanation of the verdict. The goal is to extract the closing statement (explanation) from the lengthy justifying article. Table 3 shows an example of explanation extraction on this dataset when using biased TextRank.

We designated the justification article as the input text and use the statement to be fact-checked as the bias text to be fed into biased TextRank. Similar to the Atanasova et al. (2020) system, we picked the top 4 ranked sentences as the extracted explanation. We compared the explanation extraction performance of biased TextRank with two unsupervised baselines: the Lead-4 baseline from Atanasova et al. (2020), which takes the leading 4 sentences of the input as the explanation; and TextRank, which computes an extractive summary of the fact-check report for an explanation. While Atanasova et al. (2020) introduced a supervised method trained on 10,146 instances, achieving 35.70 ROUGE-1, 13.51 ROUGE-2 and 31.58 ROUGE-L F1 scores on the LIAR-PLUS test set, we believe the results of their system are not directly comparable to ours, given our fully unsupervised setting.

The results for these experiments are presented in Table 4. As observed, biased TextRank outperforms both unsupervised baselines by at least 2.92 ROUGE-1, 2.97 ROUGE-2 and 1.94 ROUGE-L F1 scores on the validation set and 2.79 ROUGE-1, 2.97 ROUGE-2 and 1.84 ROUGE-L F1 scores on the test set. We believe these improvements demonstrate biased TextRank's effectiveness in extracting explanatory supporting sentences for a given claim as an unsupervised and lightweight method.

TABLE 3

An example of explanation extraction from the LIAR-PLUS dataset with important information highlighted. The first two rows show a claim and a redacted fact-check report of that claim, followed by actual and Biased TextRank extracted supporting explanations.

Claim: "Nearly half of Oregon's children are poor."
Fact-Check Report: "With the State Board of Higher Education handing oversight of Oregon's universities to independent boards, Jim Francesconi, one of the state board members, recently took to The Oregonian's opinion pages to note a few of the issues the new custodians will have to deal with. Among them he said, and most importantly, education has to be accessible. "Oregon," he

TABLE 3-continued

An example of explanation extraction from the LIAR-PLUS dataset with important information highlighted. The first two rows show a claim and a redacted fact-check report of that claim, followed by actual and Biased TextRank extracted supporting explanations.

wrote, "must demonstrate that working people and poor folks can still make it in America. Education after high school is the way, but it is out of reach for many children, especially in rural Oregon. Nearly half of Oregon's children are poor." It was the line about the percentage of poor children in the state that caught one Oregonian reader's attention. Oregon is hardly a rich state - particularly when the national economy itself is down and out - but nearly half? That seemed a stretch. We agreed with our report, "nearly 50% of children are either poor or low income." Francesconi almost immediately realized his mistake.
"In retrospect, I wish I would have said poor or low income." . . . there is a distinction between poor and low income as far as the U.S. government is concerned.
If you check the . . . Census information, you'll find that . . . 23 percent of children in Oregon live in . . . below . . . poverty level while another 21 percent live in low-income families.
As far as the U.S. government is concerned, about a quarter of the state's children are poor, not half . . .                                                            (redacted)
Ground Truth: So where does this leave us? Francesconi said in an opinion piece that "nearly half of Oregon's children are poor." In fact, if you use federal definitions for poverty, about a quarter are poor and another quarter are low-income. But experts tell us that families that are described as low-income still struggle to meet their basic needs and, for all intents and purposes, qualify as poor. Be that as it may, Francesconi was referencing a report that used the federal definitions.
Biased TextRank: "Nearly half of Oregon's children are poor." According to that report, "nearly 50% of children are either poor or low-income." Low income refers to families between 100 and 200 percent of the federal poverty level. As far as the U.S. government is concerned, about a quarter of the state's children are poor, not half.

25

TABLE 4

Explanation extraction evaluations. The performance of our Biased TextRank unsupervised system is compared against two unsupervised baselines.

| Model | Validation | | | Test | | |
|---|---|---|---|---|---|---|
| | ROUGE-1 | ROUGE-2 | ROUGE-L | ROUGE-1 | ROUGE-2 | ROUGE-L |
| Lead-4 | 27.92 | 6.94 | 24.26 | 28.11 | 6.96 | 24.38 |
| TextRank | 27.72 | 7.41 | 23.19 | 27.74 | 7.42 | 23.24 |
| Biased TextRank | 30.84 | 10.38 | 26.20 | 30.90 | 10.39 | 26.22 |

Ablation Study. To understand how the algorithm parameters affect biased TextRank, we carry out an ablation study where we examine how the damping factor and the similarity threshold affect the rankings produced by Biased TextRank across tasks. The results of the study are presented in FIGS. 1A-1C. The similarity measure (cosine similarity) and the document embedding model (SBERT) in this study are fixed. Also, while conducting this experiment, we increase the number of selected summary sentences from 20 to 30 to add more variance to our visualizations.

We derive the following observations from the ablation study: (1) The damping factor (DF illustrated and d in the expression above), within suggested ranges found in the literature (0.8 to 0.9), has very limited effect on biased TextRank for focused summarization and explanation extraction; (2) With the exception of the Democrat focused summaries, the variance of the similarity threshold does not significantly change the outcome of biased TextRank. For the Democrat focused summarization experiment, a lower similarity threshold, which translates to a more dense graph representation of the document, yields better results; (3) Given these results, we recommend setting the damping factor to 0.85 (or anywhere between 0.8 to 0.9) and the similarity threshold around 0.65 to obtain reasonable results.

FIG. 2 illustrates an example process for achieving biased TextRank in accordance with an example. FIG. 3 illustrates an example process for achieving biased TextRank in accordance with another example, in which information leaks are removed prior to an embedding process performed on the natural language input text and an embedding process performed on the query text.

In various examples, biased TextRank is implemented in a process as follows for processing natural language text using a graph and using a computing device. The process includes obtaining, natural language input text comprising a plurality of text units and obtaining a query text and parsing the natural language input text into the plurality of text units, associating each of the plurality of text units with a graph node, and removing information leak text units from the plurality of text units to generate a remaining set of the plurality of text units. The process further includes determining at least one connecting relationship between at least two of the remaining set of the plurality of text units and associating the at least one connecting relationship with at least one graph edge connecting at least two of the plurality of graph nodes. The process further includes associating a probabilistic relation between each graph node and the query text, and constructing a graph using the plurality of graph nodes that correspond to one of the remaining set of the plurality of text units and the at least one graph edge. The process further includes based on the probabilistic relations between each graph node and the query text, determining graph node restart probabilities for one or more of the graph nodes associated with each of the remaining plurality of text units and generating a query text-based biased graph of the remaining set of the plurality of text units and containing graph nodes. Further the process includes ranking the graph nodes of the query text-based biased graph by applying a graph-based ranking algorithm biased towards assigned random restart probabilities at the graph nodes using the probabilistic relation associated with each graph node and the query text.

Figure 4:
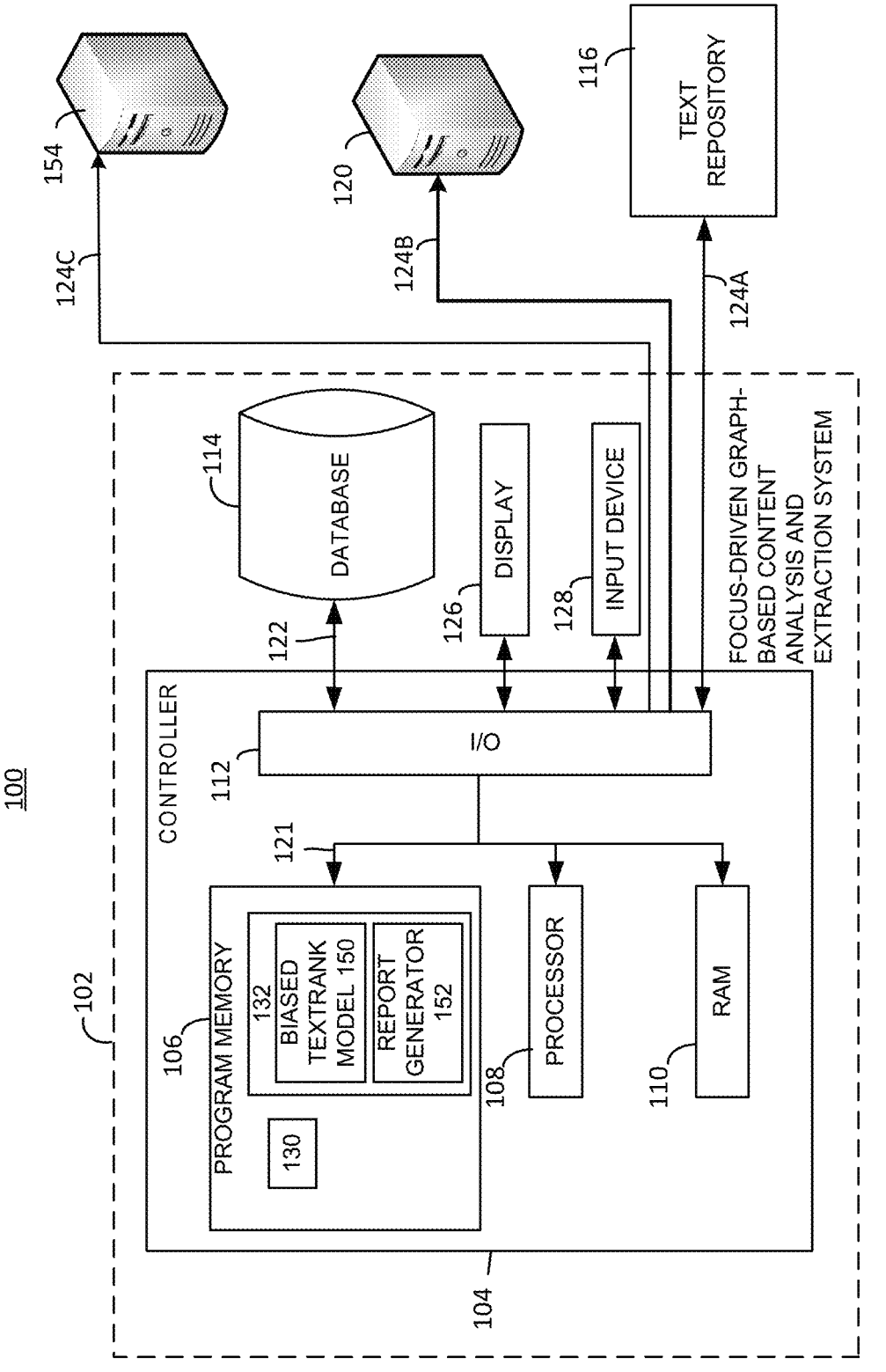
FIG. 4 is a block diagram of an example system for performing the processes and methods described herein, in accordance with an example.

The processes of FIGS. 2 and 3 and other process and methods herein may be implemented on a computing system such that as shown in FIG. 4, which shows an example block diagram 100 illustrating the various components used in implementing an example embodiment of the present techniques. A signal-processing device 102 (or "signal processor" or "diagnostic device") is configured to collect text data, in particular natural language input text and query text from a text repository 116 or other text source.

The signal-processing device 102 may have a controller 104 operatively connected to a database 114 via a link 122 connected to an input/output (I/O) circuit 112. It should be noted that, while not shown, additional databases may be linked to the controller 104 in a known manner. The controller 104 includes a program memory 106, one or more processors 108 (may be called microcontrollers or a microprocessors), a random-access memory (RAM) 110, and the input/output (I/O) circuit 112, all of which are interconnected via an address/data bus 721. It should be appreciated that although only one processor 108 is shown, the controller 104 may include multiple microprocessors 108. Similarly, the memory of the controller 104 may include multiple RAMs 110 and multiple program memories 106. Although the I/O circuit 112 is shown as a single block, it should be appreciated that the I/O circuit 112 may include a number of different types of I/O circuits. The RAM(s) 110 and the program memories 106 may be implemented as semiconductor memories, magnetically readable memories, and/or optically readable memories, for example. Links 124A, 124B, and 124C, which may include one or more wired and/or wireless (Bluetooth, WLAN, etc.) connections, may operatively connect the controller 104 to the text repository 116, the text database 120, and a remote computer system 154 through the I/O circuit 112, respectively. In other examples, the text repository 116 may be part of the signal-processing device 102.

The program memory 106 and/or the RAM 110 may store various applications (i.e., machine readable instructions) for execution by the processor 108. For example, an operating system 730 may generally control the operation of the signal-processing device 102 and provide a user interface to the signal-processing device 102 to implement data processing operations. The program memory 106 and/or the RAM 110 may also store a variety of subroutines 732 for accessing specific functions of the signal-processing device 102. By way of example, and without limitation, the subroutines 732 may include, among other things a Biased TextRank model module 150 for receiving NLP input text and query text the text repository 116 or other database 120. The module 150 may perform, for example, focus of a content-extraction, summarizations of NLP text, keyword extractions of NLP text, explanation extraction of NLP text, etc. A report generator module 152 may include subroutines for assessing analyses of the Biased TextRank module 150 and generating a report thereof, such as.

The subroutines 732 may also include other subroutines, for example, implementing software keyboard functionality, interfacing with other hardware in the signal processing device 102, etc. The program memory 106 and/or the RAM 110 may further store data related to the configuration and/or operation of the signal-processing device 102, and/or related to the operation of the one or more subroutines 732. For example, the data may be data gathered by the text repository 116, data determined and/or calculated by the processor 108, etc. In addition to the controller 104, the signal-processing device 102 may include other hardware resources. The signal-processing device 102 may also include various types of input/output hardware such as a visual display 126 and input device(s) 128 (e.g., keypad, keyboard, etc.). In an embodiment, the display 126 is touch-sensitive, and may cooperate with a software keyboard routine as one of the software routines 732 to accept user input.

It may be advantageous for the signal-processing device 102 to communicate with a plurality of different text sources or networks (not shown) through any of a number of known networking devices and techniques (e.g., through a private network such as an intranet, the Internet, etc.). For example, the signal-processing device may be connected to a text aggregator system 154.

The system 100 may be implemented as computer-readable instructions stored on a single dedicated machine, for example, one with one or more computer processing units. In some examples, the dedicated machine performs only the functions described in the processes of FIGS. 2 and 3, and any other functions needed to perform those processes. The dedicated machine may be a standalone machine or embedded within another computing machine, such as system 100. In other examples, the functions described in FIGS. 2 and 3 are integrated within an existing computing machine.

In some examples, one or more of the functions of the system 100 may be performed remotely, including, for example, on a server connected through a wired or wireless interface and network. Such distributed processing may include having all or a portion of the processing of system 100 performed on a remote server. In some embodiments, the techniques herein may be implemented as software-as-a-service (SaaS) with the computer-readable instructions to perform the method steps being stored on one or more the computer processing devices and communicating with one or more user devices.

As our experiments demonstrate, biased TextRank is a new method for focused content extraction. We demonstrate that a written description of the focus of a content-extraction task is an intuitive way of operationalizing a corresponding solution. With biased TextRank, we found that choosing the right bias text to direct the focus of content extraction is useful. In some examples, the bias term comes as an input to the algorithm. However that need not be the case always. The focused summarization experiment (among other tasks) may rely on manual selection of the bias term. In those environments, biases may be chosen that best reflect the intention of the task focus and be aware of short-comings of word embeddings. In our experience in the focused summarization experiment, we initially found our Republican and Democrat summaries to be more similar than desired. As we probed the summaries, we found that although different in essence, the two chosen bias terms were producing similar embedding vectors and we suspected the vagueness and word overlap in both bias terms were among the causes. After selecting more distinct and clear bias terms for each summary flavor, we observed more distinctions and desired properties in produced summaries.

While the foregoing experiments were performed with biased TextRank in focused sentence extraction for English texts, biased TextRank is language-agnostic in the sense that if we have the proper tools to parse and embed non-English documents, the algorithm will be directly applicable. With recent advances in multilingual contextual embedding technologies like LASER (which provides embeddings for more than 100 languages), it is further possible to immediately apply it to languages other than English.

Additional Exemplary Embodiments

Aspect 1: A method of processing natural language text using a graph, the method comprising: obtaining, at one or more processors, natural language input text comprising a plurality of text units and obtaining a query text; parsing, at the one or more processors, the natural language input text into the plurality of text units, associating each of the plurality of text units with a graph node, and removing information leak text units from the plurality of text units to generate a remaining set of the plurality of text units; determining, at the one or more processors, at least one connecting relationship between at least two of the remaining set of the plurality of text units and associating the at least one connecting relationship with at least one graph edge connecting at least two of the plurality of graph nodes; associating, at the one or more processors, a probabilistic relation between each graph node and the query text; constructing, at the one or more processors, a graph using the plurality of graph nodes that correspond to one of the remaining set of the plurality of text units and the at least one graph edge; based on the probabilistic relations between each graph node and the query text, determining graph node restart probabilities for one or more of the graph nodes associated with each of the remaining plurality of text units and generating a query text-based biased graph of the remaining set of the plurality of text units and containing graph nodes; and ranking the graph nodes of the query text-based biased graph by applying a graph-based ranking algorithm biased towards assigned random restart probabilities at the graph nodes using the probabilistic relation associated with each graph node and the query text.

Aspect 2: The method of aspect 1, further comprising: identifying information leaks using a comparison between ground truth data and the natural language input text.

Aspect 3: The method of any of the preceding aspects, wherein identifying information leaks using the comparison comprises: determining if there are exact mentions of a ground truth label final answer present in the natural language input text document and removing the final answers from the natural language input text.

Aspect 4: The method of any of the preceding aspects, further comprising applying a similarity threshold to each graph node to determine whether two graph nodes are connected to at least one graph edge; and in response to a similar threshold being met, allowing connections among the two graph nodes with a certain level of similarity and otherwise preventing a connection between the two graph nodes.

Aspect 5: The method of any of the preceding aspects, further comprising applying a cosine similarity function to each graph node to determine a similarity between the graph node and the query text.

Aspect 6: The method of any of the preceding aspects, further comprising applying a damping factor to adjust the ranking of the graph nodes of the query text-based biased graph toward the query text, where decreasing the damping factor increases random restart probabilities at the graph nodes and increasing the damping factor decreases the random restart probabilities at the graph nodes.

Aspect 7: method of any of the preceding aspects, further comprising performing random restarts at graph nodes by assigning highest restart probabilities to graphs nodes that are most similar to the query text.

Aspect 8: The method of aspect 7, further comprising performing random restarts by assigning a real number between 0 to 1 to each graph node based on determined similarity to the query text.

Aspect 9: The method of any of the preceding aspects, further comprising performing random restarts by applying the expression:

$$BiasedTextRank(V_i) =$$

$$BiasWeight_i * (1-d) + d * \sum_{V_j \in In(V_i)} \frac{w_{ji}}{\sum_{V_k \in Out(V_j)} w_{jk}} BiasedTextRank(V_j)$$

where $BiasWeight_i$ is set to a value indicating a similarity of a graph node $V_i$ to the query text, and d is a damping factor.

Aspect 10: The method of any of the preceding aspects, further comprising selecting at least one keyword from the plurality of text units based upon the rankings of graph nodes.

Aspect 11: The method of any of the preceding aspects, wherein the plurality of text units comprises a plurality of sentences, the method further comprising selecting at least one of the plurality of sentences based upon the rankings.

Aspect 12: The method of any of the preceding aspects, further comprising forming a summary of the natural language input text, the summary comprising the at least one selected sentence.

Aspect 13: The method of any of the preceding aspects, further comprising forming at least one summary of the natural language input text by combining sentences having the highest rankings determined using the rankings associated with the plurality of sentences in the plurality of texts and the query text.

Aspect 14: The method of any of the preceding aspects, further comprising selecting at least one word sense associated with at least one of the plurality of text units based upon the rankings of the graph nodes.

Aspect 15: The method of any of the preceding aspects, wherein selecting the plurality of text units from the natural language input text comprises selecting a plurality of open-class words from said at least one natural language text.

Aspect 16: The method of any of the preceding aspects, wherein associating at least one word sense with each text unit comprises determining at least one of a synonym word, word phrase, concept, and a definition associated with each text unit.

Aspect 17: The method of aspect 16, wherein determining the at least one synonym word, word phrase, concept, or definition comprises determining the at least one synonym word, word phrase, concept, or definition based upon a lexical knowledge base.

Aspect 18: The method of any of the preceding aspects, wherein determining the at least one connecting relation between at least two of the plurality of word senses comprises determining the at least one connecting relation between at least two of the plurality of word senses based upon a semantic, lexical, or syntactic relation.

Aspect 19: The method of aspect 18, wherein determining the at least one connecting relation between at least two of the plurality of word senses based upon the semantic, lexical, or syntactic relation comprises determining the at least one connecting relation between at least two of the plurality of word senses based on hypernymy, hyponomy, meronomy, holonomy, entailment, causality, attribute, and pertainimy, or based on co-occurrence information from a raw or annotated corpus.

Aspect 20: The method of any of the preceding aspects, wherein determining the at least one connecting relation between at least two of the plurality of word senses comprises forming a coordinate connecting relation based on a plurality of semantic relations.

Aspect 21: The method of any of the preceding aspects, wherein determining the at least one connecting relation between at least two of the plurality of word senses comprises forming a connecting relation between co-occurring text units.

Aspect 22: The method of any of the preceding aspects, wherein determining at least one keyword based on the plurality of text units and the plurality of rankings comprises sorting the graph nodes based upon the plurality of rankings.

Aspect 23: The method of aspect 22, wherein determining the at least one keyword comprises selecting at least one keyword based upon the ranking of the graph nodes.

Aspect 24: The method of aspect 22, wherein determining the at least one keyword comprises forming at least one multi-word key word from the selected keywords.

Aspect 25: The method of any of the preceding aspects, wherein forming at least one multi-word keyword comprises combining a plurality of adjacent selected keywords.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the target matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding; and no unnecessary limitations should be understood therefrom, as modifications within the scope of the invention may be apparent to those having ordinary skill in the art.

What is claimed:

1. A method of processing natural language text using a graph, the method comprising:

obtaining, at one or more processors, natural language input text comprising a plurality of text units and obtaining a query text indicating a focus for the graph;

parsing, at the one or more processors, the natural language input text into the plurality of text units;

removing, at the one or more processors, information leak text units from the plurality of text units to generate a remaining set of the plurality of text units;

associating, at the one or more processors, an embedding of each of the remaining set of the plurality of text units with a graph node of a plurality of graph nodes;

determining, at the one or more processors, at least one connecting relationship between at least two of the remaining set of the plurality of text units and associating the at least one connecting relationship with at least one graph edge connecting at least two of the plurality of graph nodes;

associating, at the one or more processors, a probabilistic relation between each graph node and the query text, the probabilistic relation indicating a similarity between a respective graph node and the focus for the graph;

constructing, at the one or more processors, a graph using the plurality of graph nodes that correspond to one of the remaining set of the plurality of text units and the at least one graph edge;

based on the probabilistic relations between each graph node and the query text, (i) determining random restart probabilities for one or more of the plurality of graph nodes associated with each of the remaining set of the plurality of text units and (ii) generating a query text-based biased graph of the remaining set of the plurality of text units, the query text-based biased graph containing the one or more of the plurality of graph nodes; and ranking the one or more of the plurality of graph nodes of the query text-based biased graph by applying a graph-based ranking algorithm biased towards the random restart probabilities of the one or more of the plurality of graph nodes using the probabilistic relation associated with each respective graph node and the query text.

2. The method of claim 1, further comprising: identifying information leaks using a comparison between ground truth data and the natural language input text.

3. The method of claim 2, wherein identifying information leaks using the comparison comprises: determining if there are exact mentions of a ground truth label final answer present in the natural language input text and removing the final answers from the natural language input text.

4. The method of claim 1, further comprising:

applying a similarity threshold to each graph node to determine whether two graph nodes are connected to at least one graph edge; and in response to a similarity threshold being met, allowing connections among the two graph nodes with a certain level of similarity and otherwise preventing a connection between the two graph nodes.

5. The method of claim 1, further comprising applying a cosine similarity function to each graph node to determine a similarity between the graph node and the query text.

6. The method of claim 1, further comprising applying a damping factor to adjust the ranking of the one or more of the plurality of graph nodes of the query text-based biased graph toward the query text, where decreasing the damping factor increases random restart probabilities at the one or more of the plurality of graph nodes and increasing the damping factor decreases the random restart probabilities at the one or more of the plurality of graph nodes.

7. The method of claim 1, further comprising performing random restarts at graph nodes by assigning highest restart probabilities to graphs nodes that are most similar to the query text.

8. The method of claim 7, further comprising performing random restarts by assigning a real number between 0 to 1 to each graph node based on determined similarity to the query text.

9. The method of claim 1, further comprising performing random restarts by applying the expression:

$$BiasedTextRank(V_i) =$$

$$BiasWeight_i * (1-d) + d * \sum_{V_j \in In(V_i)} \frac{w_{ji}}{\sum_{V_k \in Out(V_j)} w_{jk}} BiasedTextRank(V_j)$$

where $BiasWeight_i$ is set to a value indicating a similarity of a graph node $V_i$ to the query text, and d is a damping factor.

10. The method of claim 1, further comprising selecting at least one keyword from the plurality of text units based upon the rankings of graph nodes.

11. The method of claim 1, wherein the plurality of text units comprises a plurality of sentences, the method further comprising selecting at least one of the plurality of sentences based upon the rankings.

12. The method of claim 11, further comprising forming a summary of the natural language input text, the summary comprising the at least one selected sentence.

13. The method of claim 11, further comprising forming at least one summary of the natural language input text by combining sentences having the highest rankings determined using the rankings associated with the plurality of sentences in the plurality of text units and the query text.

14. The method of claim 1, further comprising selecting at least one word sense associated with at least one of the plurality of text units based upon the rankings of the one or more of the plurality of graph nodes.

15. The method of claim 1, wherein selecting the plurality of text units from the natural language input text comprises selecting a plurality of open-class words from said at least one natural language text.

16. The method of claim 1, wherein associating at least one word sense with each text unit comprises determining at least one of a synonym word, word phrase, concept, and a definition associated with each text unit.

17. The method of claim 16, wherein determining the at least one synonym word, word phrase, concept, or definition comprises determining the at least one synonym word, word phrase, concept, or definition based upon a lexical knowledge base.

18. The method of claim 1, wherein determining the at least one connecting relation between at least two of a plurality of word senses comprises determining the at least one connecting relation between at least two of the plurality of word senses based upon a semantic, lexical, or syntactic relation.

19. The method of claim 18, wherein determining the at least one connecting relation between at least two of the plurality of word senses based upon the semantic, lexical, or syntactic relation comprises determining the at least one connecting relation between at least two of the plurality of word senses based on hypernymy, hyponomy, meronomy, holonomy, entailment, causality, attribute, and pertainimy, or based on co-occurrence information from a raw or annotated corpus.

20. The method of claim 1, wherein determining the at least one connecting relation between at least two of a plurality of word senses comprises forming a coordinate connecting relation based on a plurality of semantic relations.

21. The method of claim 1, wherein determining the at least one connecting relation between at least two of a plurality of word senses comprises forming a connecting relation between co-occurring text units.

22. The method of claim 1, wherein determining at least one keyword based on the plurality of text units and the plurality of rankings comprises sorting the one or more of the plurality of graph nodes based upon the plurality of rankings.

23. The method of claim 22, wherein determining the at least one keyword comprises selecting at least one keyword based upon the ranking of the one or more of the plurality of graph nodes.

24. The method of claim 23, wherein determining the at least one keyword comprises forming at least one multi-word key word from the selected keywords.

25. The method of claim 1, wherein forming at least one multi-word keyword comprises combining a plurality of adjacent selected keywords.

* * * * *